June 22, 1926.

J. F. O'BYRNE 1,589,548

CONFECTION CUTTING AND COATING MACHINE

Filed July 18, 1922   3 Sheets-Sheet 1

Inventor
Joseph F. O'Byrne.
By A. J. O'Byrne
Attorney

June 22, 1926.

J. F. O'BYRNE 1,589,548

CONFECTION CUTTING AND COATING MACHINE

Filed July 18, 1922    3 Sheets-Sheet 3

Inventor
Joseph F. O'Byrne.
By
Attorney

Patented June 22, 1926.

1,589,548

UNITED STATES PATENT OFFICE.

JOSEPH FRANCIS O'BYRNE, OF GOLDEN, COLORADO.

CONFECTION CUTTING AND COATING MACHINE.

Application filed July 18, 1922. Serial No. 575,907.

This invention relates to a machine for automatically cutting confections and coating the same, and has special reference to a machine for cutting ice cream and for coating the same with chocolate.

It has lately become quite customary to vend ice cream in parallelepipedal blocks which have been dipped into a bath of liquid chocolate which hardens in place leaving the ice cream enclosed in an edible covering, which adds to the taste and food value and also serves to retain the enclosed cream in its original shape.

It is the object of this invention to produce a machine that will automatically cut the ice cream into proper sized parallelopipeds and to dip the same in a bath of liquid chocolate, after which they are permitted to cool and then deposited on a belt conveyor from which they are taken by girls who wrap the same in suitable material.

I obtain the above object by means of a machine which I will now describe in detail, reference being had for this purpose to the accompanying drawing in which Fig. 1 is a side elevation of my machine, with parts thereof broken away.

The same reference characters will be used to indicate the same or similar parts throughout the several views.

Figure 1:
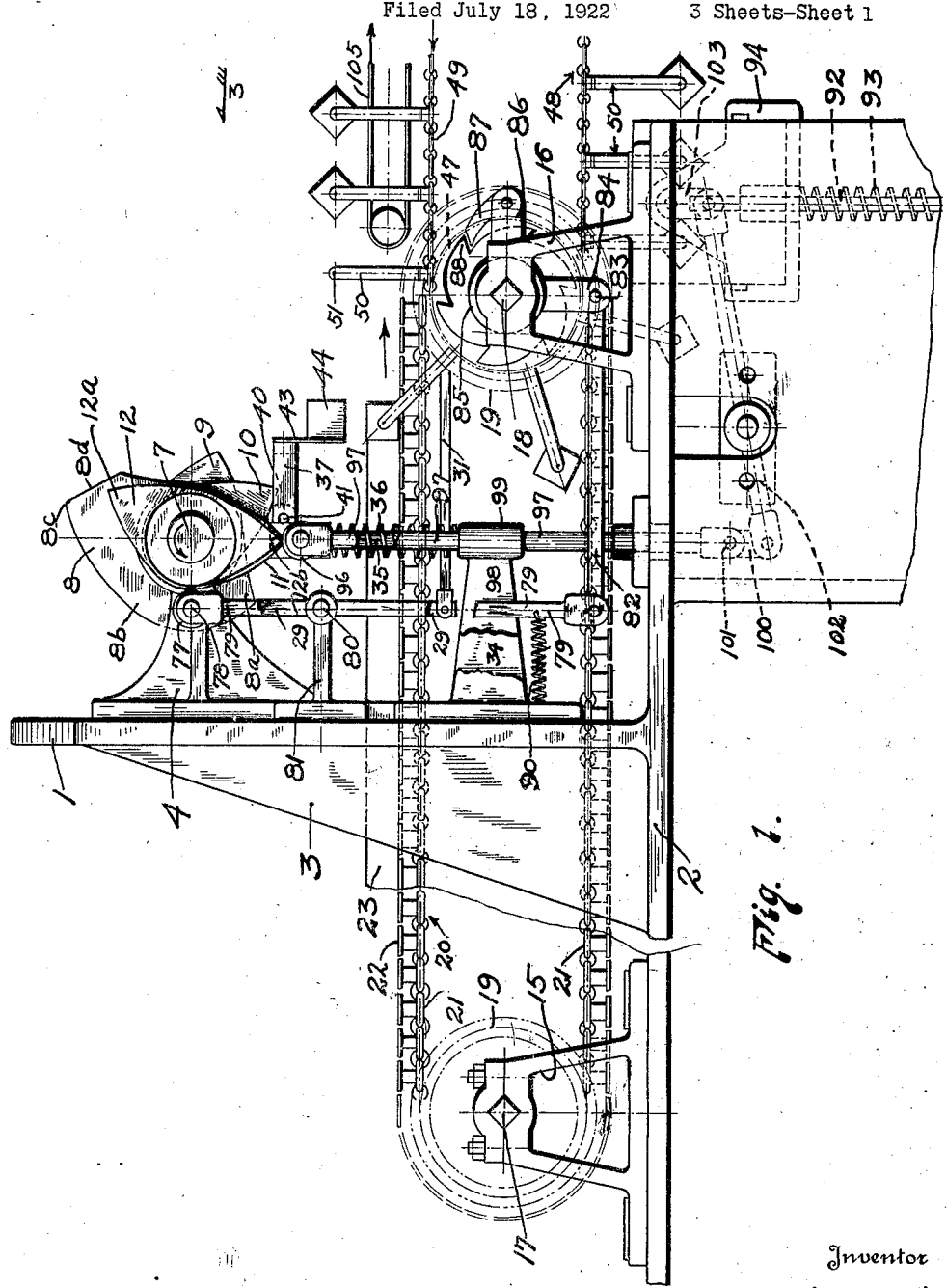

Numeral 1 represents the framework as a whole, and which has a base portion or flange 2 by means of which it is secured to a supporting base structure (not shown). I also provide a plurality of closed buttresses or strengthening flanges 3 which serve to give rigidity and strength to the framework. Secured to the front side of the vertical portion of the frame 1 are a pair of spaced bearings 4 and 5 which are securely clamped thereto by means of bolts (not shown) which pass through the longitudinal slots 6. Rotatably mounted in bearings 4 and 5 is a cam shaft 7 which carries a plurality of cams 8, 9, 10, 11 and 12, the function and operation of which will be hereinafter explained. Each cam is provided with a hub 13 which accommodates a set screw 14 by means of which the cams are held in place on the shaft. Mounted on the base 2 are four brackets 15 and 16. A shaft 17 is non-rotatably mounted in the brackets 15 and another shaft 18 is similarly mounted in brackets 16. Secured to shafts 17 and 18 are two pairs of sprocket wheels 19 which are indicated by dot and dash lines in Fig. 1, and which may be connected by a sleeve in the manner shown in Fig. 3, in connection with sprockets 47. An endless conveyor 20 is mounted on the sprocket wheels 19. Conveyor 20 consists of a pair of parallel sprocket chains 21 to each link of which is secured a transverse strip 22. The surfaces of the strips 22 form a table-like surface which serves as a support for the ice cream slab 23. A toothed ratchet wheel 25 is non-rotatably secured to the shaft. A sleeve 24 is rotatably secured on shaft 18 and is provided with an arm 26 which carries a pawl 27 which is adapted to engage the teeth on the ratchet wheel 25 for the purpose of moving the conveyor belt 20 in the direction of the arrow (Fig. 1). A cam 9 engages a roller 28 which is rotatably secured to the end of a lever 29 which is pivoted between its ends at point 30 and has its lower end connected by means of a rod 31 with the arm 32 on sleeve 24. A spring 33 tends to constantly hold the roller 28 against the face of the cam 9. As the shaft 7 is rotated in a counter-clock-wise direction, cam 9 which is secured thereto rotates therewith, and as it is so formed that it has a single point and is symmetrical, it will cause the roller 28 to move backwards and forwards once each revolution of shaft 7. The motion of roller 28 will be transmitted through links 29 and 31 to arm 32 and will cause the sleeve 24 to oscillate on shaft 18, whereby pawl 27 will move the ratchet wheel 25 one tooth at each revolution of shaft 7. The parts are so proportioned that the forward movement of the conveyor 20 at each revolution of cam 9 is sufficient for the purpose under consideration. Secured rigidly to the front side of the upright portion of frame 1 are two brackets 34, to the front ends of which is firmly clamped a pair of parallel upright guides 35 which are surrounded by cylindrical compression springs 36. A rigid frame 37 has each end provided with a tubular bearing portion 38 through which the guides 35 pass. Bearings 38 rest on the upper ends of springs 36 in the manner shown in Fig. 3.

Figure 2:
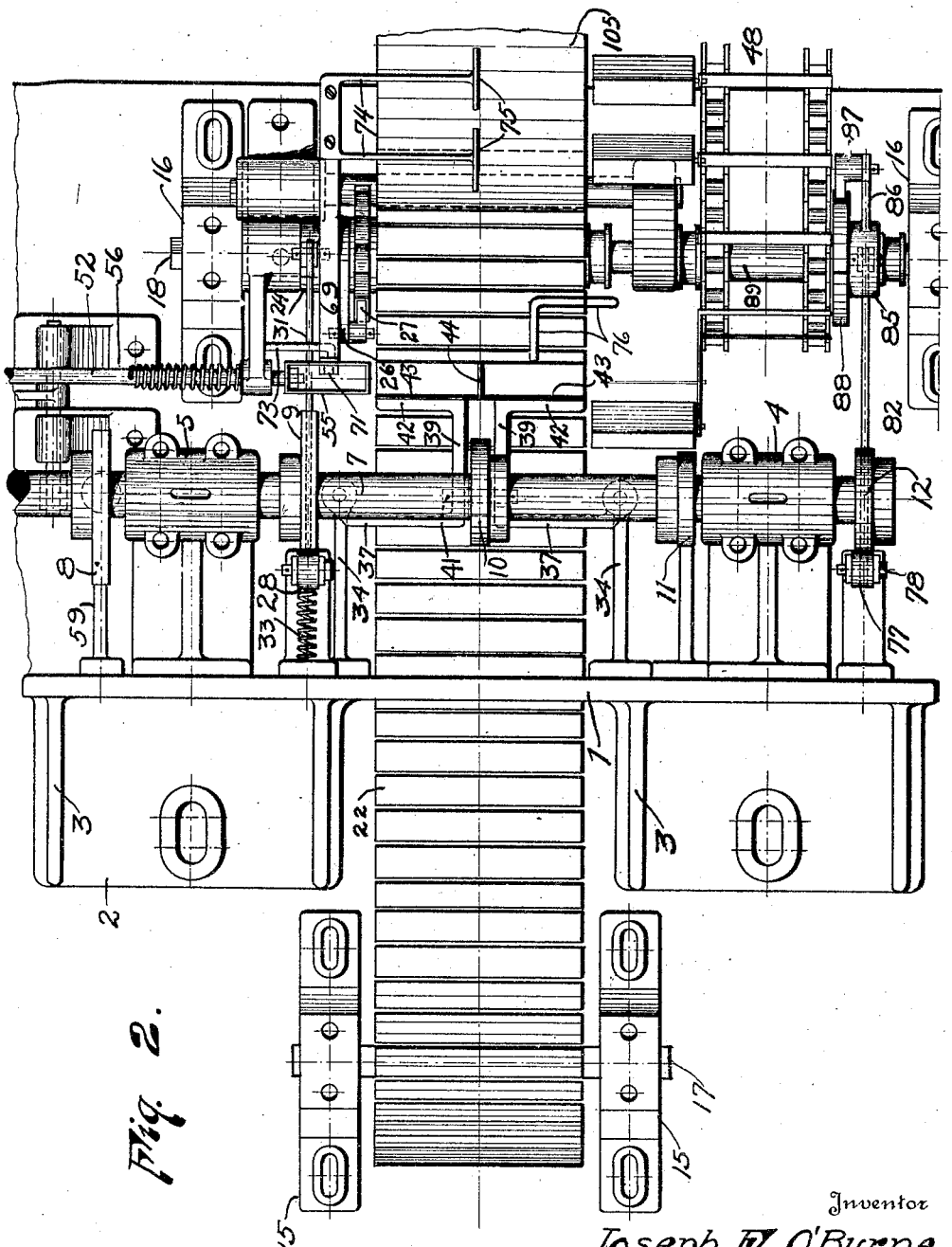
Fig. 2 is a plan view of that portion of the machine shown in elevation in Fig. 1.
Figures 3, 4:
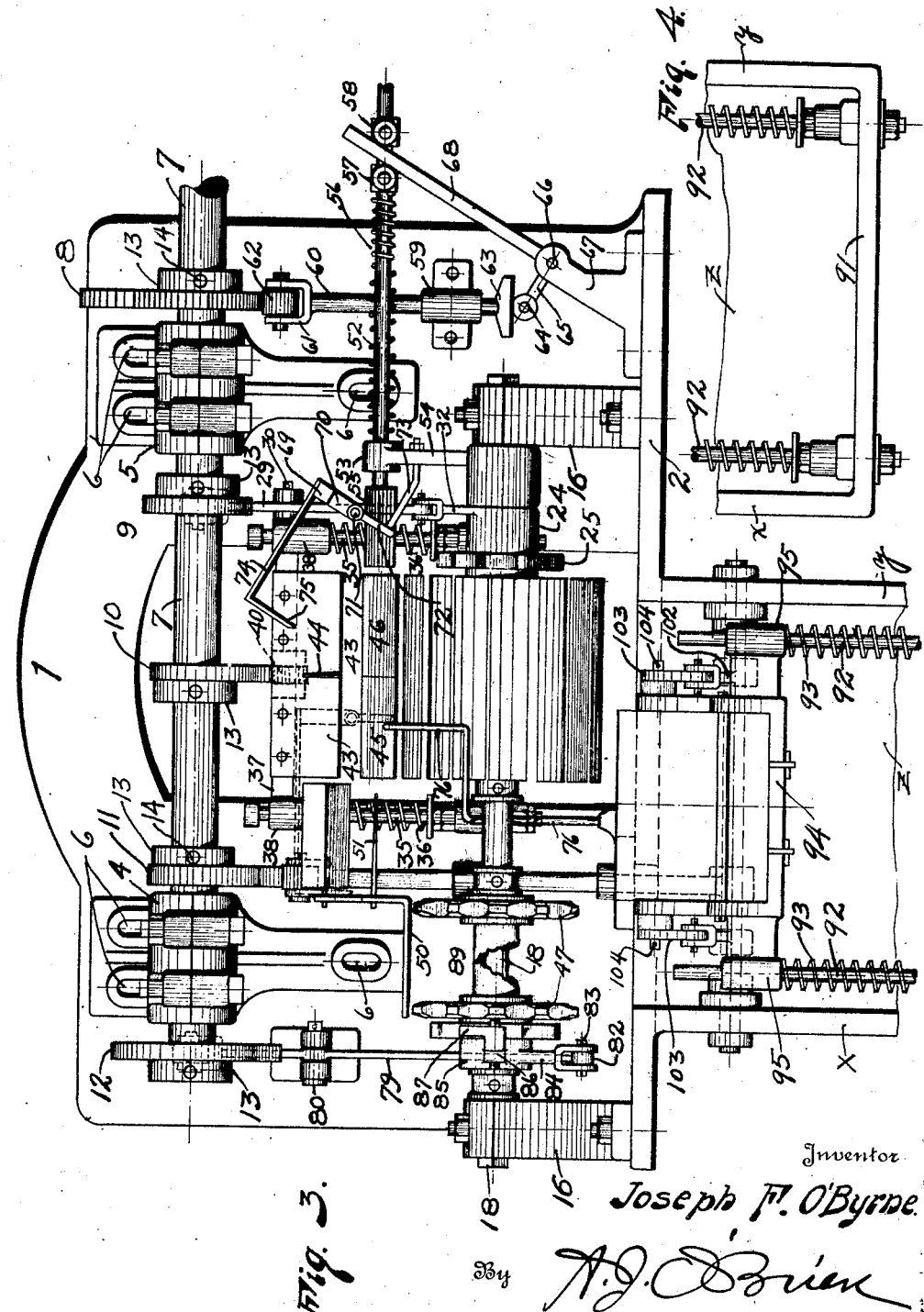
Fig. 3 is an end elevation of the machine, looking in the direction of the arrow 3 in Fig. 1.
Fig. 4 is a portion of the end elevation shown in Fig. 3.

As will be seen from Fig. 2 each of the two members 37 are substantially U-shaped, with one side shorter than the other and having their bases 39 substantially parallel but slightly spaced from each other. Between the two parts 39, I pivot a roller 40 on a shaft 41 which cooperates with the cam 10 which moves the members 37 towards and away from the upper surface of the conveyor 20 once each revolution. Secured to the shortened sides 42 of members 37 is a knife 43, having near its center a short knife 44 secured thereto at right angles. As the shaft 7 with cam 10 rotates, the latter cooperating with the roller 40, moves the cutting knives towards the table and severs two parallelepipedal blocks 45 and 46 of ice cream from the slab 23. After the knives 43 and 44 have been returned to their uppermost position by the action of the springs 36, cam 9 operates to move the conveyor forwardly the required distance, when the knives will again be operated and cut off two pieces of ice cream. After each operation of the cutting knives it is, of course, necessary to remove the blocks 45 and 46 and to dip the same in the liquid chocolate, which I accomplish by the following means:

Mounted on the two sprocket wheels 47 and two similar sprockets, not shown, is a conveyor 48, consisting of a pair of parallel endless sprocket chains 49 every fourth link of which has an upright 50 attached thereto and provided at its outer end with a pin 51. The mechanism is so adjusted that as the conveyor 48 comes to rest, it will always do so with one pin 51 located in axial alignment with the blocks 45 and 46, as shown in Fig. 1. In order to move the ice cream blocks from the conveyor 20 and impale them each on a separate pin 51, I mount a rod 52, which I shall refer to as the positioner rod, in a bearing 53 which is held rigidly in place by means of an arm 54. One end of the positioner rod 52 has a rectangular block 55 secured to the left hand end (Fig. 3) thereof. The other end of rod 52 is slidably mounted in another bearing, not shown, and so aligned that its axis will substantially coincide with the axis of the blocks 45 and 46, wherefore a movement of rod 52 to the right will move the blocks 45 and 46 to the left side of the conveyor and then impale them on one of pins 51. A cylindrical spring 56 surrounds bar 52 and abuts its ends against the bearing 53 and the movable block 57, and serves to normally keep the rod in the extreme right hand position as shown in Fig. 3. In order to reciprocate bar 52, I provide a double cam 8 on shaft 7 and directly below this cam I provide a bearing 59 within which is slidably mounted a rod 60 whose upper end is bifurcated as indicated by numeral 61. Between the sides of the bifurcated ends 61 is a roller 62 which cooperates with the cam 8. The lower end of rod 60 has a transverse head 63 which cooperates with a roller 64 attached to the short arm 65 of a bell crank lever which is pivoted at 66 in the upper end of a bracket 67, the long arm 68 of the bell crank operates between the stops 57 and 58 on the rod 52. As the shaft 7 rotate, it rotates the cam 8 and moves the rod 60 downwardly in two stages, the first movement being accomplished when the point 8$^a$ has engaged the roller 62. The downward movement of the rod 60 from the position shown in Fig. 3 to that corresponding to the engagement of point 8$^a$ with roller 62 causes the positioning bar 52 and positioner 55 to move to the left a sufficient distance to impale the block 45 on the pin 51. The cam 8 from the point 8$^a$ to 8$^b$ is circular and causes no further movement of rod 60 and positioner 55 during an angular movement of shaft 7 through approximately 90 degrees. During the time that the positioner remains stationary, cam 12 operates to bring a new pin 51 into place in a manner that will be hereinafter described. As the cam 8 rotates the portion between 8$^b$ and 8$^c$ will cooperate with roller 62 and move the positioner 55 further to the right, whereby block 46 will be impaled on the second pin 51. Pivotally connected to the positioner 55 is a bar 69 having a portion 70 thereof bent downwardly and pivoted at 71 to a lug on the positioner 55. A downwardly projecting portion 72 is so positioned that it will engage the stop 73, when the positioner moves to the right, and rotate bar 69 on its pivot 71. Secured to the front end of rod 69 are two spaced fingers whose ends are provided with plates 75. A stop 76 is rigidly secured to the base of the machine and acts as a stop for part 72 as the positioner approaches its extreme left hand position, whereby the fingers 74 are rotated about the pivot 71 and the plates 75 thrown down onto corresponding pins 51. When cam 8 has reached the position in which point 8$^c$ engages the roller 62, a further motion thereof will permit the roller 62 to follow edge 8$^d$ and permit the positioner 55 to almost immediately be returned to the position shown in Fig. 3, and fingers 74 and plates 75 will pull from the pins 51 any blocks that may be on pins 51 which are contacted by plates 75 as will be hereinafter more fully explained. Cam 12 has two points 12$^a$ and 12$^b$ and engages with the roller 77, which is pivotally mounted at 78 to the end of the lever 79, which in turn is pivoted at 80 to the end of a suitable bracket 81. The lower end of lever 79 is pivotally connected to a connecting rod 82 whose other end is pivotally connected at 83 to the end of arm 84 which forms part of a collar 85, rotatably mounted on shaft 18. Collar 85 has a second arm 86 to which is pivoted a pawl 87. Pawl 87 is adapted to engage with the teeth 88 which are formed integral with or rigidly secured to a sleeve 89 which carries two spaced sprocket wheels 47. A closed cylindrical spring 90 secured to the vertical front side of frame 1 and to the lever 79 tends to keep the roller 77 constantly in contact with the cam surface of cam 12 and to return to pawl 87 to engage a new tooth. Cam 12 has two points $12^a$ and $12^b$ and is so arranged that while cam 8 passes from the position in which point $8^a$ contacts with the roller 62 to the point $8^b$, one of the points will engage the roller 77 and rotate the sprocket wheels 47 a sufficient distance to bring a new pin into position to receive the block 46, and sometime during the period in which the positioner rod 52 remains stationary the other point of cam 12 operates to move a clean pin 51 into position to receive the block 45 of the next cut. The operation of the machine, as far as it has been described above, has cut two blocks 45 and 46 from the slab 23 and has impaled each block on a pin 51 and removed the pins so employed from the path of blocks 45 and 46 of the next cut. It now remains to provide means for coating the blocks with chocolate or similar edible coating. The base is provided with two downwardly extending parallel walls $x$ and $y$, and a rear wall $z$, which joins the same. A bottom member 91 connects the lower ends of the three walls. Secured to bottom 91 are two parallel rods 92 which are surrounded by springs 93. A tank 94 is provided at each end with a bearing 95 through which the rods 92 extend, as shown in Fig. 3. The bearings 95 rest upon the springs 93, which constantly tend to hold the tank 94 in its uppermost position but are not of sufficient strength to do so, wherefore, the tank 94 moves downwardly unless it is held in its uppermost position by the means which I will now describe.

A cam 11 is secured to the shaft 7 by means of a set screw 14, and is provided with a cam surface having a single point. The surface of cam 11 contacts with the roller 96 which is pivotally mounted in the upper end of rod 97. A bracket 98 has a bearing 99 in which the bar 97 slides. A link 100 is pivoted to the lower end of bar 97 by a pin 101 and connects it with the end of lever 102 whose other end is connected by means of a link 103 to a pin 104 secured to the upper edge of the tank 94. It is obvious that when roller 96 and rod 97 are moved downwardly by cam 11, tank 94 will be moved upwardly. Tank 94 is of such a width and so positioned that when it is raised to its uppermost position, it will enclose two of the uprights 50, and as it contains chocolate or other edible coating material in liquid state, a covering of the same will be applied to any ice cream blocks that may be on the pins 51 when they are immersed in the tank. As only two blocks (45 and 46) are cut during each revolution of the shaft 7, it is evident that the tank is required to be raised only once during each revolution and for this reason cam 11 like cams 9 and 10 has only one point, whereas cam 12 has two. Cams 11 and 12 are, of course, so adjusted that the conveyor 48 will remain stationary while the tank 94 is in its uppermost position. After the blocks have been coated by being immersed in the bath of liquid chocolate, they remain on the pins 52 until they are removed therefrom by the action of the fingers 74 and their engaging plates 75 which pull them off from the pins 51 and deposit them on the conveyor belt 105 from which they are taken and wrapped by hand.

The operation of the machine is as follows: Shaft 7 is rotated by suitable means, not shown, in the direction indicated by the arrow in Fig. 1. A slab 23 of ice cream cooled to approximately zero degrees F. is placed upon the conveyor 20. As the knife blades 43 and 44 are operated by cam 10, they pass through the slab cutting off two blocks. The first blocks cut off may be of any width and are not used. When the knife 43 is raised, cam 8 operates the positioner bar 52 and shoves one block (45) to the left impaling it on the pin 51. The positioner then remains stationary for a short interval, during which cam 12 operates to move the conveyor 48 sufficiently to bring a new pin 51 into alignment with block 46. Cam 8 then moves the positioner rod 52 and positioner 55 farther to the left until block 46 is impaled on the pin 51 after which the positioner returns; cam 9 then functions to move the conveyor 20 ahead a distance equal to the desired width of the blocks to be cut, and cam 12 functions to bring a new pin 51 into place, and then cam 11 functions, to raise and lower the tank 94. The above is repeated at each revolution of the shaft 7. When the machine has operated for a sufficient time to practically fill all the pins 51 with blocks of cream, the action of the fingers 74 will remove two blocks at a time and drop them on the conveyor belt 105.

Having now described my invention, what I claim as new is

1. In a confection making machine in combination a movable cutting table adapted to receive a slab of confection, a cutting device adapted to cooperate with the table surface and to cut blocks of confection from said slab, means for moving said blocks from the cutting table, means comprising pins for receiving said blocks as they are removed from the table, means for moving said pins away from their block receiving position and to substitute other pins in this position, and means for submerging said blocks in a bath of liquid edible material adapted to harden in place and to produce a coating on said confection.

2. In a confection making machine in combination a movable cutting table adapted to receive a slab of confection, a cutting device adapted to cooperate with the table surface and to cut blocks of confection from said slab, means for moving said blocks from the cutting table, means comprising pins for receiving said blocks as they are removed from the table, means for moving said pins away from their block receiving position and to substitute other pins in this position, means for submerging said blocks in a bath of liquid edible material adapted to harden in place and to produce a coating on said confection, and means for automatically removing the blocks from said pins after the coating has hardened.

3. In a confection cutting and coating machine in combination an endless conveyor adapted to receive a slab of confection and to serve as a cutting table, a knife mounted above said table, means for periodically moving said knife towards the table surface and for withdrawing it therefrom, whereby blocks of confection are cut from said slab, means for automatically moving said conveyor a predetermined distance between each operation of the knife whereby the slab is advanced, means for removing said blocks from the cutting table; a conveyor adjacent said cutting table, said last named conveyor having a plurality of spaced arms, pins on said arms, means for causing said pins to stop in such a position that a block of confection will be impaled thereon as it is removed from the cutting table, means for moving the pin from receiving position and for substituting an empty pin in this position, means for coating said blocks with a liquid material that will harden in place, and means for removing said blocks from the pins when the coating thereon has hardened.

4. In a confection cutting and coating machine, in combination an endless conveyor adapted to receive a slab of confection and to serve as a cutting table, a knife mounted above said table, means for periodically moving said knife towards the table surface and for withdrawing it therefrom, whereby blocks of confection are cut from said slab, means for automatically moving said conveyor a predetermined distance between each operation of the knife whereby the slab is advanced, means for removing said blocks from the cutting table, said means comprising a rod adapted to be reciprocated across said cutting table, a cam for moving said rod in one direction, a conveyor adjacent the cutting table, said conveyor having a plurality of spaced bars having pins secured thereto, means for causing said conveyor to stop in such a position that the pin is substantially in line with the axis of said rod, means for moving said conveyor so as to bring a clean pin into receiving position, means for applying a coating of edible material to said blocks, and means for removing said blocks from said pins when the coating has hardened.

5. A machine for cutting and coating ice cream comprising in combination a frame, a shaft rotatably mounted on said frame, an endless conveyor whose surface serves as a cutting table and is adapted to receive a slab of ice cream, a cam on said shaft, a pawl and ratchet connected with the conveyor, means whereby the cam operates said pawl and moves said ratchet so as to advance the slab a predetermined distance, a knife mounted on said frame and adapted to be moved towards and away from the surface of the cutting table, a cam on said shaft for moving said knife whereby blocks of ice cream are cut from said slab, and means for removing said blocks from the table, said means comprising a rod adapted to reciprocate across said cutting table, a spring for normally holding said rod in retracted position, and a cam on the shaft cooperating with suitable means for advancing said rod and shoving the blocks from the cutting table.

6. A machine for cutting and coating ice cream comprising in combination a frame, a shaft rotatably mounted on said frame, an endless conveyor whose surface serves as a cutting table and is adapted to receive a slab of ice cream, a cam on said shaft, a pawl and ratchet connected with the conveyor, means whereby the cam operates said pawl and moves said ratchet so as to advance the slab a predetermined distance, a knife mounted on said frame and adapted to be moved towards and away from the surface of the cutting table, a cam on said shaft for moving said knife whereby blocks of ice cream are cut from said slab, means for removing said blocks from the table, and means for coating the blocks with liquid chocolate, said means comprising a vertically movable tank adapted to contain the liquid chocolate, means for guiding said tank in its movements, and means including a cam on the shaft for raising and lowering said tank.

7. A machine for cutting and coating ice cream comprising in combination a frame, a shaft rotatably mounted on said frame, an endless conveyor whose surface serves as a cutting table and is adapted to receive a slab of ice cream, a cam on said shaft, a pawl and ratchet connected with the conveyor, means whereby the cam operates said pawl and moves said ratchet so as to advance the slab a predetermined distance, a knife mounted on said frame and adapted to be moved towards and away from the surface of the cutting table, a cam on said shaft for moving said knife whereby blocks of ice cream are cut from said slab, and means for removing said blocks from the table, said means comprising a rod adapted to reciprocate across said cutting table, a spring for normally holding said rod in retracted position, and a cam on the shaft cooperating with suitable means for advancing said rod and shoving the blocks from the cutting table, a conveyor for transporting said blocks after they are removed from the cutting table and means for cooling said blocks with an edible coating, said means comprising a pair of spaced guide rods, a tank slidable on said rods, a cam on said shaft and levers connecting said cam with said tank whereby the movements of the tank will be controlled by the cam.

8. In an ice cream cutting and coating machine in combination, a movable cutting table adapted to support a slab of ice cream, a cutting device movable with respect to the table and adapted to cut blocks of ice cream from the slab, a reciprocating rod movable in the line of the axis of said slabs and adapted to remove the same from the table; a conveyor adjacent said table, a number of spaced pins carried by said conveyor, means for periodically moving said conveyor and means for periodically submerging said pins in liquefied chocolate.

9. In an ice cream cutting and coating machine in combination, a conveyor adapted to support a slab of ice cream, a framework, a shaft rotatably mounted on said framework, a cam on said shaft, means whereby said cam moves said conveyor and slab a predetermined distance at each revolution of the shaft, a knife mounted on said frame and adapted to be moved towards and away from said conveyor, whereby blocks will be cut from the slab, means for removing said blocks from said conveyor and for impaling the same on a pin; a conveyor adjacent said first named conveyor and provided with a plurality of pins adapted to remove said blocks of ice cream; a tank mounted on said frame and adapted to contain chocolate in a liquefied form, said tank being movable towards and away from the pins carried by the last named conveyor and means whereby the tank is moved upwardly for the purpose of submerging said pins and blocks in the liquefied chocolate.

10. In an ice cream cutting and coating machine in combination, a conveyor adapted to support a slab of ice cream, a framework, a shaft rotatably mounted on said framework, a cam on said shaft, means whereby said cam moves said conveyor and slab a predetermined distance at each revolution of the shaft, a knife mounted on said frame and adapted to be moved towards and away from said conveyor, whereby blocks will be cut from the slab, means for removing said blocks from said conveyor and for impaling the same on a pin; a conveyor adjacent said first named conveyor and provided with a plurality of pins adapted to remove said blocks of ice cream; a tank mounted on said frame and adapted to contain chocolate in a liquefied form, said tank being movable towards and away from the pins carried by the last named conveyor, means whereby the tank is moved upwardly for the purpose of submerging said pins and blocks in the liquid chocolate and means carried by the block removing means for removing said blocks from said pins after the chocolate has hardened.

In testimony whereof I affix my signature.

JOSEPH FRANCIS O'BYRNE.